Aug. 28, 1951   C. A. BLAKESLEE   2,566,053
TEMPERATURE CONTROL APPARATUS
Filed Oct. 17, 1946   2 Sheets-Sheet 1

INVENTOR.
Clinton A. Blakeslee
BY
E. C. Sanborn
Attorney

Aug. 28, 1951  C. A. BLAKESLEE  2,566,053
TEMPERATURE CONTROL APPARATUS
Filed Oct. 17, 1946  2 Sheets-Sheet 2

INVENTOR.
Clinton A. Blakeslee
BY
E. C. Sanborn
Attorney

Patented Aug. 28, 1951

2,566,053

UNITED STATES PATENT OFFICE 2,566,053

TEMPERATURE CONTROL APPARATUS

Clinton A. Blakeslee, Waterbury, Conn., assignor to The Bristol Company, Waterbury, Conn., a corporation of Connecticut Application October 17, 1946, Serial No. 703,835

4 Claims. (Cl. 236—78)

This invention relates to means and method for controlling the magnitude of a condition by the application of a condition-affecting agent in a series of impulses whose durations are varied in response to the demand for a supply of said agent to maintain said condition with a minimum deviation from a predetermined value or magnitude. In the practice of automatic control, this form of regulation is categorically known as of the "Gouy" class. In my co-pending application Serial No. 571,752, filed January 8, 1945, now abandoned, I have shown a control utilizing a cyclically operated magnetically actuated contactor in which the durations of successive cycles of operation are varied by modifying the influence of the magnetic flux upon the contacting element in response to the deviation of the regulated magnitude from a predetermined value.

It is an object of the present invention to provide an automatic regulating system of the general class set forth in said co-pending application, and in which the impulses characterizing the intermittent application of a condition-affecting agent shall be subject not only to the deviation of said condition from a pre-established set-point, but also to the trend of said deviation.

It is a further object to provide a regulating system of the above nature in which the relation between said impulses and the condition variations to which they are responsive shall be readily and effectively adjustable to meet a wide variety of plant and operating conditions.

In carrying out the purposes of the invention, it is proposed to utilize a plurality of magnetically actuated mercury switches of the class in which the contacting mechanism and the actuating magnet bear to each other a fixed physical relationship, rendering the action of said contactors intermittent by cyclically and steplessly varying the effective field strength of each magnet upon its associated contactor, and modifying said intermittent action by more or less independently varying the position of said contactors in response to changes in the magnitude of a regulated variable. It is further proposed to associate the contactor-controlling instrumentalities with a condition-measuring instrument of the null or self-balancing class in such a manner that the effective impulses derived from said contactors will be subject to variation in response both to the actual position sought or attained by the balancing mechanism of said null-type instrument, and also to the directional influence impressed upon said balancing mechanism.

Figure 1:
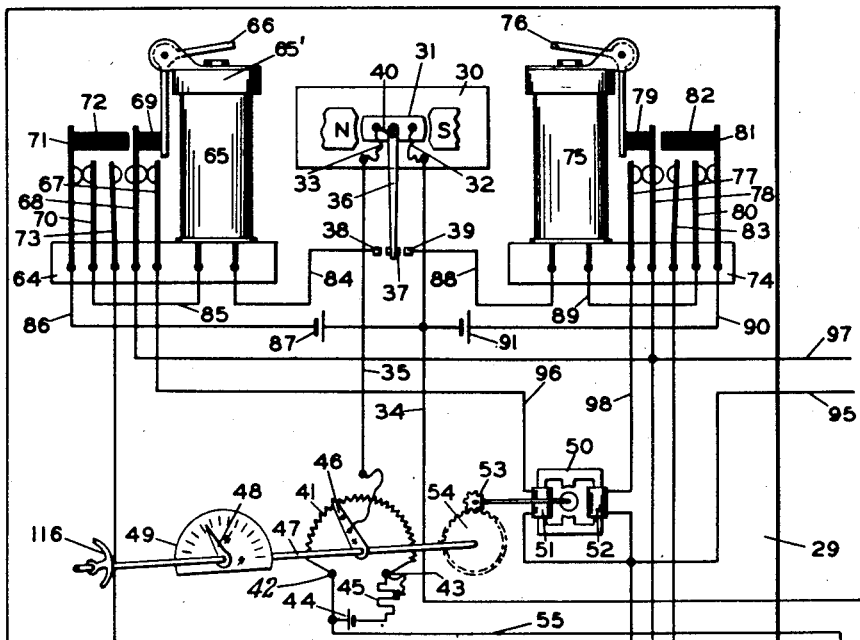
Fig. 1 is a diagrammatic representation of a temperature control installation embodying the principles of the invention.
Figure 1:
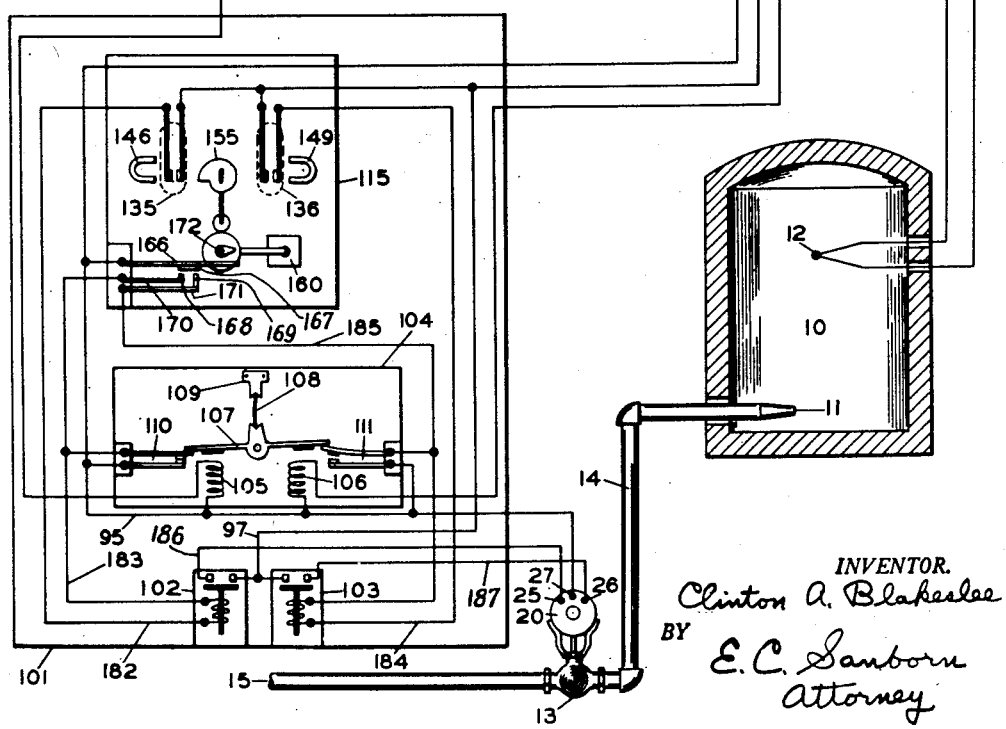

Referring now to the drawings:

The numeral 10 designates a furnace, oven, or other enclosed space adapted to be heated by the combustion of fluid fuel admitted thereto through a burner 11, and in which it is desired to maintain a predetermined constant temperature as determined by a thermocouple 12 located within the furnace, the regulation of said temperature being effected by control of the position of a valve 13 connected in a conduit 14 through which said fuel is supplied to the burner 11 from a source 15. The valve 13 is actuated by a reversible electric motor 20 provided with two windings and is adapted for rotation in a direction depending upon which of the respective windings is energized. Said two windings have a common point of interconnection, the free ends of said windings being connected to terminals 25 and 26 respectively, and the common point to a terminal 27.

Potentiometer circuit and balancing mechanism

The numeral 29 designates a self-balancing circuit mechanism similar to that fully disclosed and set forth and disclosed in U. S. Letters Patent No. 2,320,066 granted May 15, 1943 to F. B. Bristol, and having the following structure: A galvanometer 30 of the conventional form includes a coil 31 freely pivoted between poles N and S of a permanent magnet or the equivalent. Electrical connection is made to the coil 31 by means of resilient leads or springs 32 and 33 connected respectively to conductors 34 and 35, forming elements in an electrical network hereinafter to be described, whereby upon passage of current from one to the other of said conductors through said galvanometer coil, the latter will tend to be rotated through a limited angle about its axis in a sense either clockwise or counterclockwise, according to the direction of the current. Carried by the galvanometer coil is a pointer 36 bearing upon its extremity a contact member 37 adapted to engage either of two stationary contacts 38 and 39, according to the sense of the deflection. The end of the coil 31 which is connected to the spring 33 is also connected to the pointer 36 by means of a conductor 40, whereby current may pass between the conductor 34 and the pointer 36 by flowing through the galvanometer coil 31.

A potentiometer circuit includes a uniform slidewire 41 of arcuate curvature extended between terminals 42 and 43 and supplied with a steady unidirectional current from a battery or equivalent constant-voltage source 44, whose output may be regulated by means of an adjustable rheostat 45. Suitably engaging the slide-wire 41 is a movable contact-arm 46 fixed to a shaft 47 coaxial with the center of curvature of the slide wire 41, and insulated therefrom, whereby upon rotation of said shaft through a limited angle, the contact arm 46 may traverse said slide wire throughout its length, and may assume any position along said slide wire, according to the angular position at which the shaft is brought to rest. An index 48, carried by the shaft 47, and cooperating with a fixed arcuate calibrated scale 49, provides an indication of the position of said contact arm 46 with respect to the slide-wire 41.

Rotation of the shaft 47 for the purpose of shifting the contact arm 46 along the slide-wire 41 is effected by means of a reversible electric motor 50 having two opposed windings 51 and 52, adapted normally to be simultaneously energized and to maintain said motor stationary, and, when individually deenergized, to cause said motor to be operated in one or the other direction according to which of said windings remains energized. The shaft of the motor 50 carries a pinion 53 meshing with a gear 54 fixed to the shaft 47, whereby said shaft and elements carried thereby will be angularly moved according to which of the two windings of the motor 50 is operatively effective.

The potentiometer circuit comprising the slide-wire 41, the battery 44, the rheostat 45, and the contact arm 46 is applied to the measurement of the thermoelectromotive force developed by the couple 12, and hence of the temperature within the enclosed space 10. One element of the thermocouple is connected by means of a conductor 55 to the terminal 42 of the slide wire, and the other element to the conductor 34 leading to one side of the galvanometer coil 31. The conductor 35, leading to the other side of the galvanometer, is flexibly or slidably connected to the contact arm 46, whereby the potential at any point along said slide-wire due to the flow of current therethrough from the battery 44, may be applied to the conductor 35 according to the deflected position of the contact arm.

According to well known principles upon which the art of potentiometric pyrometry is based, when the intensity and direction of the current in the slide-wire are suitably adjusted, the position of the contact arm 46, and therefore of the index 48, corresponding to a balance of the potentiometer network, as indicated by a zero deflection of the galvanometer pointer 36, is a measure of the temperature to which the thermocouple 12 is exposed. The polarity of the thermocouple 12, as connected to the conductors 34 and 35 is made such that upon an increase of potential developed by said couple due to an increase in the temperature to which it is exposed, the unbalance current due to the excess of said emf over that derived from the slide wire will cause to pass through the galvanometer coil 31 a current tending to swing said coil in a clockwise sense, and cause the contact 37 carried by the pointer 36 to be brought into electrical engagement with the stationary contact 38. In a similar manner a decrease in temperature at the thermocouple will cause the galvanometer coil to be deflected in an opposite sense, and the contact 37 brought into engagement with the stationary contact 39. The setting of the contact arm 46 with respect to the slide wire 41 is effected by the motor 50 through the medium of a relay combination substantially identical with that set forth in said F. B. Bristol patent; and, while such combination will be briefly described, no invention thereof is herein claimed.

A relay 64 embodies an actuating magnet coil 65 and an armature 66 subject thereto. The coil 65 is fitted with a short-circuited shroud or lag-plate 65', adapted to introduce a desirable time-delay in actuation of the relay, the principle of which, forming no part of the present invention, is fully set forth in said F. B. Bristol patent. Normally engaged contacts 67 and 68 are adapted to be separated by the movement of the armature 66 transmitted through an insulating pad 69 to move the contact 68 out of engagement with the contact 67 when the coil 65 is energized. Further contacts 70 and 71, also normally engaged, are adapted to be separated by movement of said armature transmitted through an insulating pad 72 when said coil 65 is energized. A further contact 73 is provided and adapted to be engaged by the movable contact 68 as the latter, upon energization of the coil 65, is moved out of engagement with the contact 67.

A relay 74, similar in all respects to relay 64, embodies a magnet coil 75 and an armature 76, together with normally closed contacts 77 and 78, the latter subject to actuation by said armature through an insulating pad 79 to separate said contacts, and further normally closed contacts 80 and 81 actuated through an insulating pad 82. The coil 75 is lagged in a manner similar to the coil 65, and all the elements of the relay 74 are proportioned and adjusted to give a performance substantially identical with that of the relay 64 with respect to sequential actuation of contact elements. A further contact 83 is provided and adapted to be engaged by the movable contact 78 as the latter, upon energization of the coil 75, is moved out of engagement with the contact 77.

The galvanometer contact 38 is connected through a conductor 84 to one terminal of the coil 65, and the free terminal of that coil by means of a conductor 85 to the contact 70. The contact 71 is connected by means of a conductor 86 to one terminal of a small battery or other suitable source of unidirectional electromotive force 87, and the other terminal of said source to the conductor 34. The galvanometer contact 39 is connected through a conductor 88 to one terminal of coil 75, and the free terminal of that coil by means of a conductor 89, contacts 80, 81, and a conductor 90, to one terminal of a D.-C. source 91, and the other terminal of said source to the conductor 34. It will be seen that, upon deflection of the galvanometer pointer 36 sufficiently for the contact 37 to engage the contact 38, a circuit will be completed from one side of the source 87 through the normally closed contacts 70—71, the magnet winding 65, the contacts 38 and 37, and the galvanometer coil 31 to the conductor 34, and thence to the other side of said source. Similarly, upon deflection of the pointer to a position of engagement with the contact 39, a circuit will be formed from one side of the source 91 through contacts 80—81, magnet coil 75, contacts 39 and 37, the galvanometer coil 31, and the conductor 34 back to the other side of said source.

The polarities of the several sources of electromotive force in the network described are so selected that upon deflection of the galvanometer in either direction by current derived from said network flowing in the coil 31, the supplementary current in said coil derived from the corresponding one of the sources 87 or 91 will be in such a direction as to tend to deflect the galvanometer in the same direction with added intensity, thus supplementing the original directive effort, and tending to amplify the pressure exerted between the movable contact 37 and the stationary contact engaged thereby. The arrangement of the mechanism and the connections of the potentiometer network are such that upon energization of the winding 51 alone of the reversible motor 50 the consequent movement of the contact arm 46 along the slide-wire 41 will be toward the terminal 42 and will tend to reduce the potential between the conductors 55 and 35; and when the winding 52 is energized alone, the movement of the arm 46 will be toward the terminal 43 and will tend to increase said potential.

One terminal of each of the windings 51 and 52 of the reversible motor 50 is connected to a common conductor 95 representing one side of an electric power supply. The free terminal of the winding 51 is connected by means of a conductor 96 to the contact 67 in the relay 64, and the cooperating contact 68 to a conductor 97, forming the other side of said supply. The free terminal of the motor winding 52 is connected by means of a conductor 98 to the contact 77, and the coacting contact 78 to the conductor 97. Thus, it will be seen that with the contact pairs 67—68 and 77—78 in their normally closed positions, both windings of the motor 50 will be simultaneously energized, tending to stall the motor, and that with one of these contact pairs opened while the other remains closed, the motor will be energized for rotation in a corresponding direction as hereinbefore stated. The operation of the device, as thus far set forth, may be briefly stated as follows: If the position of the contact arm 46 with respect to the slide-wire 41 is such that there exists a condition of balance between the potential developed by the couple 12 and that derived from the potentiometer network, the galvanometer will stand in its undeflected position, with the contact 37 out of engagement with either of the cooperating contacts 38 and 39; and relays 65 and 75 will be de-energized, and their respective contact pairs 67—68 and 77—78 closed, causing both windings of the motor 50 to be energized, and the motor consequently to remain at rest. Upon a deviation of the thermocouple potential from that derived from the slide-wire, the unbalanced condition will cause a current to flow in the galvanometer coil 31 deflecting it in a sense to close a corresponding contact, and to energize which ever one of the relays 64 and 65 will close the motor 50 to be operated in a direction to move the contact arm 46 to a position on the slide-wire where a condition of balance will be restored. For purposes of discussion it may be assumed that upon an increase in the temperature measured by the thermocouple 12 the contacts of the galvanometer 30 will be actuated in a sense to energize the coil 65 of the relay 64, with a consequent contact action causing the motor 50 to rotate the shaft 47 and parts carried thereby in a clockwise sense as seen in the drawing, and vice versa. This balancing action is characteristic of many forms of null-type instruments and, as it forms no part of the present invention, and, moreover, is fully set forth in the aforementioned F. B. Bristol Patent No. 2,320,066, need not here be further elucidated. The function of the current flowing through the galvanometer coil 31 from the sources 87 and 91 through the contact pairs 70—71 and 80—81, in amplifying the pressure of the galvanometer contacts, together with the timing characteristic introduced by the lagging coils or shrouds on the relay windings 65 and 75 is also identical with that shown in said patent, and need not here be explained in further detail.

*Relays and trend-responsive mechanism*

Control of the valve 13 in response to deflections of the shaft 47, and modification of said control in response to the trend of said deflections is effected by instrumentalities comprising in combination the following elements: Included in a control assembly 101 are two circuit-closing relays 102 and 103, and a mechanically locking relay 104. The latter relay is provided with two coils 105 and 106 and a deflectable armature 107 adapted to be alternatively acted upon by said coils in a sense to deflect it to either of its extreme positions according to the identity of the energized coil. A toggle spring 108 suitably interposed between said armature and stationary abutment 109 serves to lock said armature in the position assumed consequent to energization of either of said coils and to retain it in that position until the other of said coils is energized. The relay 104 is further provided with two pairs of coacting contacts 110 and 111, the former being electrically engaged and locked in that position after energization of the coil 105, while the latter remains open, and the respective conditions of said contacts being interchanged after energization of the coil 106.

Figure 2:
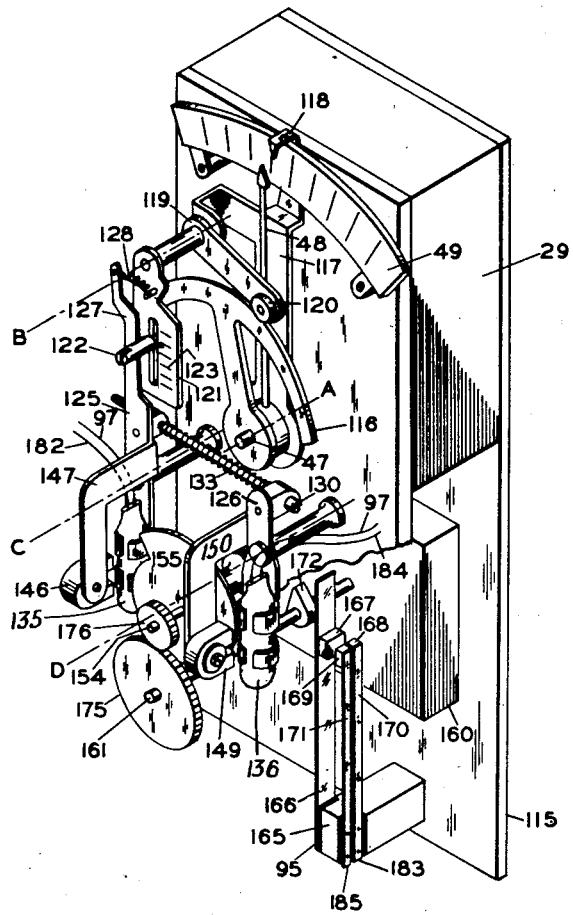
Fig. 2 is an isometric view of mechanical instrumentalities combined in a manner to implement the purposes of the invention.

The mechanical instrumentalities whereby the hereinbefore described relays may be rendered effective to control the valve 13 in response both to variations in the temperature of the thermocouple 12 and to the trend of said variations will best be understood by reference to Fig. 2, taken in conjunction with Fig. 1 of the drawings. In addition to said relays, there is included in the control assembly 101 a mounting base 115, to which may be secured the self-balancing circuit mechanism 29 in addition to further devices presently to be described. Carried by the shaft 47 of said self-balancing mechanism is a cam member 116, and having a spirally conformed profile whereby its effective radius at any selected fixed position will be varied with angular displacement of said shaft. Mounted for adjustable positioning through a limited angle about an axis A concentric with the shaft 47 is an arm 117 carrying a pointer or index 118 adapted to cooperate with the graduated scale 49 in providing an indication of the adjusted position of said arm. Integral with said arm is a bearing portion having journalled thereon for deflection through a limited angle about an axis B parallel to, and movable about, the axis A, a lever arm 119 substantially tangential to the contour of the cam member 116 and terminating in a cam-follower element 120 adapted to engage the periphery of said cam member, whereby to deflect said arm about the axis B through an angle dependent upon the angular position about the axis A of the arm 117 in relation to the shaft 47 and the cam member 116 carried thereby. Attached to the arm 119, and deflectable therewith, is a downwardly extending arm 121 carrying a radially adjustable pin 122, and preferably provided with a graduated scale portion 123 whereby the radial distance of said pin from the axis B may readily be determined.

Pivotally mounted for limited angular deflection about horizontally displaced axes C and D, both parallel to the axis A, are vertically disposed arms 125 and 126, each adapted to carry an electrical circuit-controlling member of a type presently to be described. The arm 125 is provided with an upwardly-extending part 127 having a substantially radial edge adapted to be engaged by the pin 122, whereby said arm will be deflected about the axis C as the arm 121 is deflected about the axis B, the angular displacement of the former arm with respect to that of the latter being dependent upon the adjusted position of the pin 122 in relation to the scale 123. Positive engagement of the edge of the part 127 with the pin 122 is assured by a tension spring member 128 extended between suitably positioned abutments positioned respectively on said extended part 127 and on said arm 121.

A screw 130 passing through a pivoted abutment on the arm 126 and threadedly engaging a pivoted abutment on the arm 125, and encircled by a compression spring 133 bearing against said abutments, serves to maintain said arms in substantial parallelism while at the same time permitting angular adjustment of one of said arms with respect to the other.

Attached to the arms 125 and 126, and movable therewith are circuit-controlling devices or contact elements 135 and 136, in the form of magnetically actuated mercury switches of the type fully set forth and described in U. S. Letters Patent No. 2,085,316, granted to K. Hunciker, June 29, 1937. Such a contactor comprises an evacuated glass envelope having in its lower portion a small pool of conducting liquid, such as mercury, and two contact elements, one stationary, and the other movable and spring supported, extending downward into said pool to make electrical contact therewith. The latter contactor is provided with a ferromagnetic armature subject to the influence of a magnet exterior to said envelope, whereby, by varying the effective field strength reaching the armature, said contact element may be caused to dip into, or spring out of, the mercury pool, thus completing or interrupting the electrical circuit between said contact elements. The conventional method of actuating contactors of this type is by either moving a permanent magnet in relation thereto, or by varying the excitation of an electromagnet having one of its poles juxtaposed to said armature. An operating performance better suited to the purposes of the present invention is obtained by mounting a magnetically-actuated contactor and a permanent magnet in fixed relationship, and varying the effective field strength of the latter upon the former by the expedient of more or less interposing between the magnet and the armature a ferromagnetic shield, whereby to divert or shunt more or less of the flux of the magnet, and thus cause the field effective upon the armature to be varied above and below a predetermined minimum value necessary to actuate the same. The operation of a magnetically-actuated mercury switch by diversion of more or less of the flux from a juxtaposed permanent magnet is set forth in U. S. Letters Patent No. 2,214,159, granted to F. B. Bristol September 10, 1940, and also in my hereinbefore mentioned copending application Serial No. 571,752.

Figure 3:
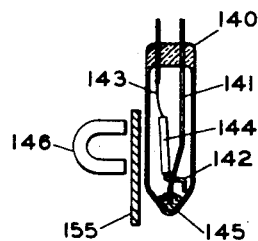
Figs. 3 and 4 are sectional views showing an important element of the invention in two of its characteristic operating positions.
Figure 4:
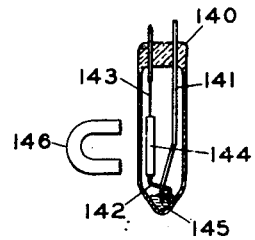

In Figs. 3 and 4 is shown the magnetically actuated contactor 135 with its component elements in their two respective characteristic operating positions. Sealed through the walls of an evacuated glass envelope 140 and having terminals exterior thereto, are two contact elements 141 and 142, the former stationary with respect to said envelope and the latter movably supported by a resilient spring member 143 and carrying a small ferromagnetic armature 144. The stationary contact element 141 rests at all times with its lower tip in a pool or globule of mercury 145 lying in the lowest part of the envelope 140, while the movable contact element 142 is normally maintained by the influence of the resilient spring member 143 in a position out of engagement with the surface of said pool, as indicated in Fig. 3. Secured to a bracket part 147 integral with, and projecting outward from, the arm 125, is a small permanent magnet 146, separated from the outer surface of the envelope 140 by an air gap, and so disposed with respect to the elements therein that its field, acting directly upon said armature, will be sufficient to deflect the same and its supporting contact element 142 against the influence of the spring member 143 from the normal position of non-engagement with the pool 145 to a position where said contact element will touch the mercury, completing an electrical circuit between the external terminals.

The contactor 136, mounted upon the movable arm 126, is identical in all respects with the contactor 135, and is adapted to be similarly responsive to a permanent magnet 149 secured to a bracket part 150 integral with the arm 126. The mountings of said contactors and their respectively associated magnets is made such that the interposed air gaps embrace a common plane perpendicular to the axes C and D about which said contactors and magnets are movable with angular displacements of their respective supporting arms 125 and 126.

Carried by a shaft 154, journalled for continuous rotation about an axis parallel to the axes C and D, and substantially midway between the contactors 135 and 136, is a spirally conformed plate 155 of ferromagnetic material adapted to pass freely through the air gaps between said contactors and their associated magnets. The structure, material and conformation of the plate 155 are made such that when the portion of greatest radius is interposed in the air gap between either of the contactors and its associated magnet, as indicated in Fig. 3, sufficient of the flux therefrom will be diverted or shunted through the mass of the plate as effectually to "short circuit" the magnet and provide a barrier, so that the armature of the contactor will be released, and the movable contact member permitted under the influence of its resilient support to deflect to its open-circuit position. When the portion of the plate 155 having its minimum radius is toward the air gap, the diversion of flux will be insufficient materially to weaken the effective strength of the magnet, so that the armature will be attracted, as indicated in Fig. 4, and the movable contact moved to its "closed-circuit" position. Thus, if the plate 155 be rotated about its axis, the electrical circuits of the contactors 135 and 136 will be intermittently, alternately, and independently opened and closed.

The mobility of the contactors 135 and 136 about the axes C and D respectively imparts to them a freedom of displacement having a component radial to the plate 155, from which it will be obvious that, because of the spiral conformation of said plate, the durations of respective "open-circuit" and "closed-circuit" intervals due to rotation of said plate may be varied with such motion of the contactors. Moreover, by virtue of the interlinking of the arms 125 and 126 by the extended screw 130, the tendency will be for an increase in the "open" interval attendant upon deflection of one, to be accompanied by an increase in the "closed" interval attendant upon the deflection of the other, of said arms, and vice versa.

Mounted upon the base 115 is a motor device 160 having a shaft 161 extending forward parallel to the shaft 154 and adapted for continuous rotation at a speed of the order of 12 revolutions per minute. Supported upon an insulating post 165 carried by the base 115 is a contact assembly comprising a deflectable resilient arm 166 having a contact member 167 adapted to engage simultaneously two mutually insulated contact members 168 and 169 carried by arms 170 and 171 respectively, also supported upon the post 165. Carried by the shaft 161 is an eccentric cam member 172 adapted to engage the resilient arm 166, and deflect it to an extent that the contact member 167 is brought into electrical engagement with the contacts 168 and 169 for a portion of each revolution of said shaft.

Carried on the forward extremity of the shaft 161 is a gear 175 meshing with a pinion member 176 on the shaft 154. Said gear members are preferably made removable, or otherwise adapted to convenient changing of the velocity ratio between the shafts 161 and 154. While this ratio is subject to variation in accordance with the nature of the plant under regulation, it has been found that a large proportion of control requirements are met when the relative dimensions of the gear and pinion are such that the shaft 154, and the barrier-plate 155 carried thereby make five revolutions for each revolution of the shaft 161, the cam member 172 rotating with said last-named shaft being proportioned and adjusted with respect to the contact system actuated thereby so that the contact 167 is in engagement with the contacts 168 and 169 for a time interval representing one complete revolution of the plate 155.

Electrical connections

The combined elements of the control assembly 101 are operatively associated with those of the self-balancing circuit mechanism 29, and with the valve motor 20, by means of the following electrical connections shown in Fig. 1: The contact spring 166, one side of each of the contacts 110—111, and of the coils 105—106, in the locking relay 104, together with the common terminal 27 of the motor 20, are all connected to the line conductor 95. One side of each of the mercury contactors 135—136 and one side of each of the contacts in the relays 102—103 are connected to the line conductor 97. The contact 73 of the potentiometer-balancing relay 65 is connected to the free terminal of the locking relay coil 105 by means of a conductor 180; and the contact 83 of the relay 75 to the free terminal of the coil 106 by means of a conductor 181. The free terminal of the contactor 135 is connected to one side of the winding of relay 102 by means of a conductor 182, and the other side of said winding by means of a conductor 183 to the free side of contact 110 and to contact arm 170. Similarly, the free terminal of the contactor 136 is connected to one side of the winding of relay 103 by means of a conductor 184, and the other side of said winding by means of a conductor 185 to the free side of contact 111 and to contact arm 171. The free contacts of the relays 102 and 103 are connected by means of conductors 186 and 187 to the terminals 25 and 26 respectively of the valve motor 20, whereby closing of the contacts of relay 102 will apply the line voltage existing between conductors 95 and 97 to the motor to operate the same in a sense to close the valve 13, and closing of the contacts of relay 103 will apply said voltage to the motor to open said valve.

Operation of control mechanism (General)

The manner in which the shaft 47 and parts carried thereby, including the index or pointer 48 and also the cam member 116 are caused to assume angular positions representative of temperatures to which the thermocouple 12 is exposed has already been made clear; and the manner in which the position of said cam member is coordinated with the trend of temperature change to regulate said temperature will now be explained. By adjustment of the screw 130, the relative positioning of the arms 125 and 126, with the contactors 135 and 136 carried thereby, is made such that when the indication of the pointer 48 coincides with the setting of the index 118 on the scale 49, the angular position of the arm 119 about the axis B, and also of the arm 121 will be such that said two contactors, displaceable thereby, will be alternately and equally influenced by the barrier plate 155 in its continuous rotation. Thus, in each cycle determined by the rotation of said plate, the "closed-circuit" intervals of said respective contactors will be of equal duration, as also will the "open-circuit" intervals. The conductors 182 and 184 will thus be alternately, and for equal time intervals, connected to the line conductor 97.

Operation (Deviation-responsive characteristic)

Since the control system has a dual characteristic, responsive to both the deviation of the measured variable from the control point and the trend of such deviation, its action will best be understood by considering the nature of such responses more or less independently. With this object in view, it may first be assumed that the contacts 167—168—169 are allowed to remain in mutual engagement, as might be done by releasing the cam 172 from the shaft 161 and locking it in the position where said contacts are maintained in a closed-circuit condition. Under these conditions, it will be seen that the contacts 110 and 111 of the relay 104 are bridged through conductors 183—185, both connected to the line conductor 95. Thus, as the conductors 182—184 are alternately connected to the line conductor 97 through the intermittent action of the mercury contactors, the relays 102—103 will be alternately energized, imparting to the motor 20 reversing action, whereby the valve 13 will oscillate through a small range. Since, under the hereinbefore stated condition of agreement between the measured and set temperature values, the alternate energization intervals of the relays 102 and 103 are mutually equal, the mean position of the valve 13 will remain unchanged, and the average rate of fuel admission to the furnace 10 will be constant.

Assuming, now, that the temperature at the thermocouple 12 should rise, with a consequent rotation of the shaft 47 in a clockwise sense, it will be seen that, due to the eccentric conformation of the cam member 116 rotating with said shaft, the arms 119 and 122 will be angularly displaced about their common axis B, and the latter arm, acting through the pin 122 upon the extended portion 127 of the arm 125, (which arm is operatively connected to the arm 126 through the interconnecting screw 130) will cause the arms 125 and 126 both to be deflected in a clockwise sense about their respective axes. Thus, the mercury contactor 135, together with its associated magnet 146, will be swung to a position more remote from the center of the plate 155, and consequently will be for a shorter period in each revolution subject to the shielding influence of said plate, while the cycle of operation of the contactor 136 will be subject to change in the opposite sense. Thus, the impulses of the relay 102, derived from the contactor 135 will be lengthened, and those of the relay 103 correspondingly shortened, with the result that the "closing" impulses upon the valve 13 are increased, while the "opening" impulses are decreased, with a resultant action tending to close said valve, lessen the fuel supply, and lower the temperature in the heated space. Conversely, it will be obvious that a lowering of temperature at the thermocouple 12, acting through the potentiometer mechanism 29 and the cam member 116, will be responsible for a displacement of the mercury contactors to positions with respect to the rotating barrier plate 155 where the net result of their alternate impulses will be to open the valve 13 and increase the fuel supply.

*Operation (Trend-responsive characteristic)*

The regulation, as above described, while responsive only to the direction of deviation of the regulated variable from the control point, would in itself tend to maintain the temperature at the predetermined desired value, but would be slow of response and would tend to set up an oscillatory condition whose elimination is one of the objects of the present invention. In order to obtain an understanding of the response of the control system to the trend of change in the regulated variable, consideration may now be given to the performance obtained if the cam 172 were to be locked in a position where the contacts 167—168—169 remain out of engagement, all other elements of the control operating in a normal manner. Since the contacts 110 and 111 of the relay 104 are no longer bridged by said cam-actuated contacts, circuits will be completed between the conductors 182—184 to the line conductor 97 only as one or other of said relay contacts is closed by action of the relay 104 in response to energization of one or other of its actuating windings 105 and 106. Since these windings have each one side connected to the line conductor 95, and their other sides alternatively through the conductors 180 and 181 and the contact systems of the relays 64 and 74 respectively to the line conductor 97, it follows that the position assumed by the armature of the relay 104 will depend upon which of the contact pairs 68—73 or 78—83 was last engaged, which, in turn, will depend upon which of the relay coils 65—75 was last energized. Thus, the contacts 110 or 111 in the relay 104 will assume a position dependent upon the sense of the latest deflection of the galvanometer coil 31, as subject to the direction or trend of temperature change at the thermocouple 12, and will retain that position until there occurs a reversal in the trend of temperature change.

If it be assumed that the direction or trend of temperature change is upward, the relay 64 of the potentiometer-balancing mechanism will be active, and each time the coil 65 is energized, the consequent contact actions will include intermittent closures of the contact elements 68—73, so that the coil 105 of the relay 104 will be energized, causing said relay upon the first such energization to assume the position shown in the drawing, with the contacts 110 closed and the contacts 111 open, and so to remain until such time as the coil 106 may be energized. With the contacts 167—169 separated, and the parallel path provided by the contacts 111 interrupted, the relay 103 cannot be energized; so, as long as these conditions exist, no "opening" impulses will be imparted by the motor 20 to the valve 13. At the same time, the closed contacts 110 of the relay 104 provide a path whereby the relay 102 may be energized through the mercury contactor 135, so that the impulses derived from said contactor, and of durations dependent upon the displacement of the regulated magnitude from the control point, will be imparted to said relay, and thereby to the motor 20 in a sense progressively to close the valve 13 and reduce the fuel supply at a rate of reduction dependent upon the magnitude of the required correction.

Should the trend of temperature change become downward, this will immediately be reflected in a counter-clockwise deflection of the galvanometer coil 31, a consequent engagement of the contacts 37—39, energization of the relay coil 75, and a momentary closing of the contacts 78—83, with resultant energization of the relay coil 106, whereupon the armature of the relay 104 will at once move to, and lock into, a position where the contacts 110 are opened and the contacts 111 closed. Under this condition only "opening" impulses can be imparted to the fuel valve 13, so that an increase in fuel supply will be initiated immediately upon the temperature change taking a downward trend, and without waiting for the regulated temperature to fall below the value at which the index 118 may be set.

*Summary of operation*

Both the above-discussed conditions of performance have been based on the assumption of the cam 172 remaining inactive to affect the relation between the contact 167 with its two mating contacts 168—169; and it will be seen that, so long as a closed-circuit condition exists among these contacts, regulation will be effected solely in response to deviation of the regulated value from the control point, and while an open-circuit condition exists, regulation will depend primarily upon the trend of said deviation. The intermittent closing and opening of said contacts, due to action of the cam member 172 will cause the performance of the control to alternate between the two characteristics; and, with the 5/1 ratio between the speeds of the shafts 154 and 161, there will be obtained four successive adjustments of the fuel valve in response to the "anticipatory" characteristic introduced by the trend-sensitive elements of the combination, followed by a single adjustment in direct response to the actual deviation, thus positively stabilizing the control point and eliminating any tendency to "drift" or to develop a reversed action subsequent to extremely sudden changes in the value of the measured variable or in the setting of the control point.

Manual alteration of the position of the pin 122 radially with respect to the arm 121 will vary the angle of displacement of the arms 125 and 126 about their respective axes for a given displacement of the shaft 47, thus providing an adjustment of the "throttling range" of the control. The screw 130, acting in opposition to the influence of the compression spring 133, to determine the angle between the arms 125 and 126, makes it possible to regulate the relative durations of "closed" and "open" intervals for the mercury contactors 135 and 136, and, if desired, by spreading the contactors sufficiently far that in a neutral position neither of them is influenced by the plate 155, to establish a "dead zone" in which no regulating action will take place.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a condition-regulating system, a measuring member adapted to assume a position representative of the magnitude of a condition to be regulated, a member movable in response to changes in said condition and thereby adapted to control the position of said measuring member, a pair of switch means for controlling a condition-affecting agent in different senses respectively, means subject to the position of said measuring member for actuating the respective switch means in alternate impulses of durations dependent upon said magnitude, and means subject to said movable member and independent of the position of said measuring member for modifying the relative activity of said respective switch means.

2. In a device for controling a variable condition, means for producing an electrical effect proportional to the magnitude of said condition, and opposing said effect to a predetermined electrical effect, a movable member adapted to be displaced in a direction dependent upon the difference between said opposed effects, a measuring member adapted to be positioned under the influence of said movable member and to assume a position representative of said magnitude, a pair of switch means for controling a condition-affecting agent in different senses respectively, means for actuating the respective switch means in alternate impulses of durations dependent upon the position of said measuring member, and means for superimposing on said switch means an influence subject to said movable member and independent of the position of said measuring member to modify the relative activity of the respective switch means.

3. In a condition-regulating system, a measuring member adapted to assume a position representative of the magnitude of a condition to be regulated, a member movable in response to changes in said condition and thereby adapted to control the position of said measuring member, a pair of switch means for controling a condition-affecting agent in different senses respectively, means subject to the position of said measuring member for actuating the respective switch means in alternate impulses of durations dependent upon said magnitude, means subject to said movable member and independent of the position of said measuring member for inhibiting operation of one of said switch means when said movable member is in one position and for inhibiting operation of the other of said switch means when said movable member is in another position, and means for periodically inhibiting the action of said inhibiting means.

4. In a condition-regulating system, a measuring member adapted to assume a position representative of the magnitude of a condition to be regulated, a member movable in response to changes in said condition and thereby adapted to control the position of said measuring member, a pair of switches for controling a condition-affecting agent, impulse transmitting means controlled by said measuring means for transmitting cyclical impulses of durations corresponding to magnitudes of said condition, other impulse transmitting means for transmitting cyclical impulses of durations complemental to those of the first mentioned transmitting means, connections from the respective transmitting means to the respective switches, means subject to said movable member and independent of said measuring means for establishing communication between one of said switches and the corresponding transmitting means when said movable member is in one position while concurrently disrupting communication between the other switch and its transmitting means and for establishing communication between said other switch and transmitting means when said movable member is in another position while concurrently disrupting communication between the first mentioned switch and transmitting means, and means for periodically establishing communication concurrently between both said switches and the corresponding transmitting means regardless of the position of said movable member.

CLINTON A. BLAKESLEE.

REFERENCES CITED

The following references are of record in the file of this patent:

UNITED STATES PATENTS

| Number | Name | Date |
| --- | --- | --- |
| 2,119,061 | Stein et al. | May 31, 1938 |
| 2,209,566 | Hornung | July 30, 1940 |